United States Patent
Nishino

(10) Patent No.: US 8,013,577 B2
(45) Date of Patent: Sep. 6, 2011

(54) CHARGING SYSTEM, CHARGING APPARATUS AND BATTERY PACK

(75) Inventor: Hajime Nishino, Osaka (JP)

(73) Assignee: Panasonic Corporation, Osaka (JP)

( * ) Notice: Subject to any disclaimer, the term of this patent is extended or adjusted under 35 U.S.C. 154(b) by 928 days.

(21) Appl. No.: 11/950,071

(22) Filed: Dec. 4, 2007

(65) Prior Publication Data

US 2008/0129252 A1 Jun. 5, 2008

(30) Foreign Application Priority Data

Dec. 4, 2006 (JP) .................... 2006-326721
Nov. 9, 2007 (JP) .................... 2007-292285

(51) Int. Cl.
*H02J 7/04* (2006.01)
*H02J 7/16* (2006.01)

(52) U.S. Cl. ......... 320/162; 320/152; 320/160; 320/163
(58) Field of Classification Search .................. 320/162, 320/152, 160, 163
See application file for complete search history.

(56) References Cited

U.S. PATENT DOCUMENTS

2004/0090209 A1 * 5/2004 Nishida et al. ............... 320/149
2005/0019659 A1 * 1/2005 Shiozaki et al. ........... 429/231.3

FOREIGN PATENT DOCUMENTS

JP 6-78471 3/1994
JP 7-220759 8/1995

OTHER PUBLICATIONS

Machine translation of JP7220759.*

* cited by examiner

*Primary Examiner* — Edward Tso
*Assistant Examiner* — Samuel Berhanu
(74) *Attorney, Agent, or Firm* — McDermott Will & Emery LLP

(57) ABSTRACT

A charging system includes a secondary battery which includes a heat-resistant member between a negative electrode and a positive electrode thereof, a charging-voltage supply section which conducts a constant-voltage charge of the secondary battery, a charge control section which controls the operation of the charging-voltage supply section, and a mode-setting acceptance section which chooses and accepts the setting of either of an ordinary charge mode and a high-voltage charge mode. When the ordinary charge mode is accepted, the charge control section conducts a constant-voltage charge of the secondary battery by supplying a voltage equal to, or below, the reference voltage, and when the high-voltage charge mode is accepted, the charge control section conducts a constant-voltage charge of the secondary battery by supplying a voltage above the reference voltage.

8 Claims, 9 Drawing Sheets

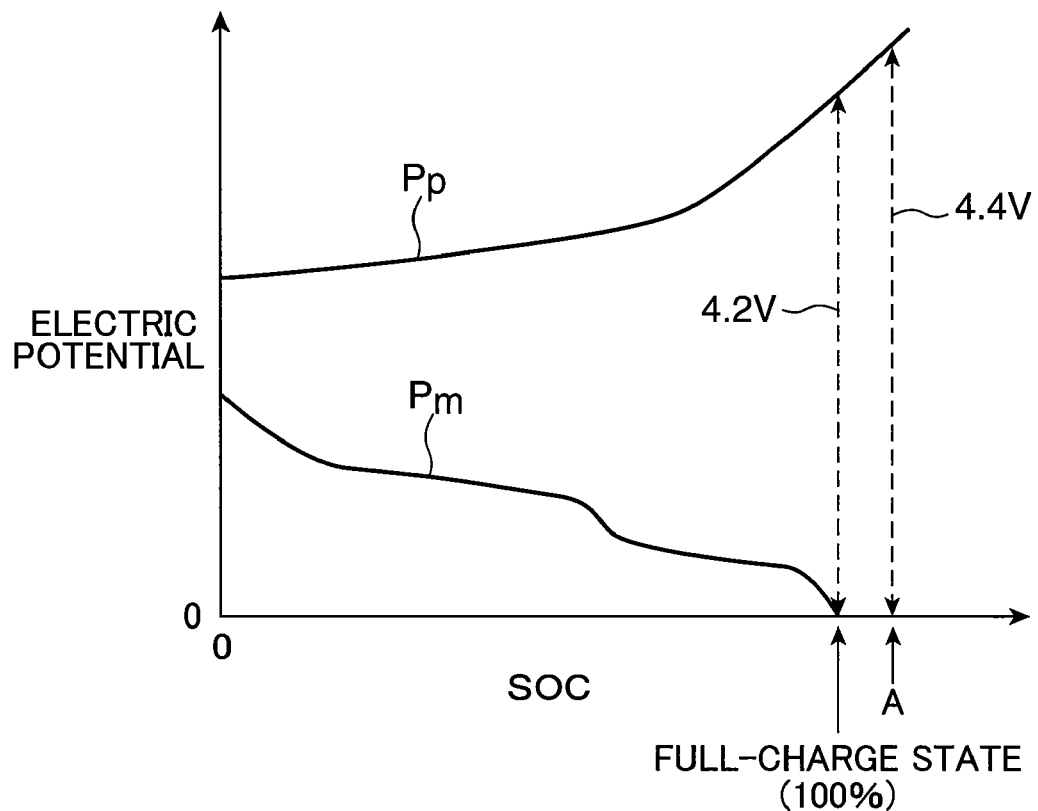

CHARGING SYSTEM, CHARGING APPARATUS AND BATTERY PACK

BACKGROUND OF THE INVENTION

1. Field of the Invention

The present invention relates to a charging system and a charging apparatus which charge a secondary battery, and a battery pack provided with a secondary battery.

2. Description of the Background Art

FIG. 8 is a graphical representation, showing a method of managing a charging voltage and a charging current according to a prior art. FIG. 8 shows graphs, indicating that a constant-current and constant-voltage (CCCV) charge is given to a lithium-ion battery. Fluctuations are shown in a terminal voltage $\alpha 1$ of a secondary battery, a charging current $\alpha 2$ supplied to the secondary battery and an SOC (or state of charge) $\alpha 3$.

First, in the case of such a CCCV charge (e.g., refer to Japanese Patent Laid-Open No. H6-78471 specification), the charge starts from a constant-current (CC) charge range. Within the constant-current (CC) charge range, a predetermined constant current I1 is supplied as the charging current, so that a constant-current (CC) charge can be conducted. The constant current I1 is set, for example, to a current value obtained by multiplying seventy percent of "1C" by a parallel-cell number PN. "1C" is a current level at which a nominal-capacity value NC can be discharged through a one-hour constant-current discharge.

Thereby, if the terminal voltage of a battery pack's charge terminal comes to an end voltage Vf determined in advance at 4.2 volts per cell (=a series-cell number SN×4.2V: in the case where three cells are in series, for example, 12.6V), then a transition is made to a constant-voltage (CV) charge range. Then, the charging current's value is reduced so that it will not exceed the end voltage Vf. If this charging-current value falls to a current value I2 set according to the temperature, then a decision is made that it is fully charged. Thereby, the charging current's supply comes to a halt. In other words, this indicates that when the charging-current value has fallen to the current value I2, SOC $\alpha 3$ is a hundred percent.

The current value I2 is a decision value for detecting a full charge. In order to bring the charge capacity to a full charge, desirably, it should ideally be zero amperes. In the constant-voltage charge, however, the closer the secondary battery comes to the full charge, the less the charging current becomes, thus making the charge slower. Hence, if the current value I2 is set to zero amperes, it takes a long time to increase a little charge capacity. Therefore, the current value I2 is suitably set by striking a balance between the capacity of a charge and the time taken for the charge. The current value I2 is set, for example, to a current value of approximately (0.1 A×parallel-cell number PN). In this case, 0.1 A is set, for example, as 1/20CA for a battery capacity C.

FIG. 9 is a graphical representation, showing fluctuations in a positive-electrode potential Pp and a negative-electrode potential Pm with respect to a lithium reference in the case where a lithium-ion battery is charged. Its horizontal axis indicates SOC and the vertical axis indicates the electric potential. As shown in FIG. 9, when the lithium-ion battery is charged, the SOC rises. Along with this, the positive-electrode potential Pp heightens and the negative-electrode potential Pm lowers. In this case, the lithium-ion battery's terminal voltage corresponds to the difference between the positive-electrode potential Pp and the negative-electrode potential Pm. In other words, it is given by Pp–Pm.

As the SOC increases, the negative-electrode potential Pm decreases and reaches zero volts. At this time, the difference between the positive-electrode potential Pp and the negative-electrode potential Pm is equivalent to the terminal voltage. Herein, the battery's capacity is designed so that the negative-electrode potential Pm becomes an electric potential (e.g., approximately 0.1 volts) higher than zero volts when the SOC comes to a hundred percent. This is conducted by taking into account the dispersion of the electric current or temperature, or the like, at the time of a charge, and further, the dispersion of the weight, or the like, at the time of manufacturing. Thereby, a margin is given so that the negative-electrode potential can be prevented from dropping to zero volts or below, even if such dispersion occurs at the same time.

In other words, the design includes measures against such dispersion, and thus, the fact that it is substantially zero volts means including a range until the negative-electrode potential becomes approximately 0.1 volts.

The lithium-ion battery's terminal voltage is affected by the dispersion of the charging-current value, the temperature and the composition of an active material for the positive electrode and negative electrode. Hence, the end voltage of charge may be set to substantially 4.2 volts if lithium cobaltate or lithium nickelate is mainly used as the positive-electrode active material. If lithium manganate, or a manganese-system positive-electrode active material obtained by substituting manganese for a part of a positive-electrode active material composed of a plurality of metallic elements, is mainly used as the positive-electrode active material, then the end voltage of charge may be set to substantially 4.2 volts or above.

In addition, if the negative-electrode potential Pm declines to a negative potential, lithium ions which have moved from the positive electrode to the negative electrode are deposited as metallic lithium on the negative electrode's surface. Then, the metallic lithium deposited on the negative-electrode surface turns to a tree-shaped dendrite crystal, or a so-called lithium dendrite. It grows toward the positive electrode and penetrates, for example, a separator made of a resin material such as polyethylene. Then, it short-circuits the negative electrode and the positive electrode. As a result, a short-circuit current passing through the lithium dendrite may melt the separator, enlarge the short circuit's part and destroy the battery.

Therefore, in order to prevent the negative-electrode potential Pm from falling to a negative potential, the end voltage Vf is set so that the terminal voltage per cell will not exceed 4.2 volts if lithium cobaltate is used as the positive-electrode active material. If a manganese-system positive-electrode active material is used as the positive-electrode active material, it is set so that the terminal voltage per cell will not exceed, for example, 4.3 volts. For example, if lithium cobaltate is used as the positive-electrode active material, the end voltage Vf is set to 4.2V×the series-cell number SN. If lithium manganate is used as the positive-electrode active material, the end voltage Vf is set to 4.3V×the series-cell number SN. Hence, when the secondary battery is charged, the charging voltage is not supposed to exceed the end voltage Vf set in this way.

Besides, if the battery is further charged after the negative-electrode potential Pm has become zero volts, metallic lithium will be deposited. Thus, it cannot be charged any more, so that the state of charge at the time when the negative-electrode potential Pm comes to zero volts is designed to be the full-charge state (SOC: 100%).

With respect to a secondary battery, there are needs for increasing its battery capacity and for restraining its degradation so that its life can be secured. In order to increase the battery capacity of a secondary battery, there can be a method of heightening the charging voltage and charging the secondary battery at a constant voltage. However, as described above, if the charging voltage becomes higher than the voltage (hereinafter, referred to as the reference voltage) between the negative electrode and the positive electrode in the full-charge state where the lithium-reference electric potential of the negative electrode is substantially zero volts, then a lithium dendrite may be formed to short-circuit the negative electrode and the positive electrode. This short-circuit current can melt the separator, enlarge the short circuit's part and destroy the battery. Hence, a disadvantage arises in that the charging voltage cannot be heightened beyond the reference voltage.

Herein, as described above, the design includes measures against the above described dispersion, and thus, the fact that it is substantially zero volts means including a range until the negative-electrode potential becomes approximately 0.1 volts.

Incidentally, as described above, even if a lithium dendrite is formed, a short-circuit current flows and heat is generated, then the short circuit's part can be prevented from becoming larger by forming a heat-resistant porous insulating film between the negative electrode and the positive electrode. A secondary battery having such a function is known (e.g., refer to Japanese Patent Laid-Open No. H7-220759 specification). In this secondary battery, even if a short-circuit current passes and heat is generated, the short circuit's part is not supposed to enlarge. Hence, it would be possible to increase the battery's charge capacity by heightening the charging voltage beyond the reference voltage.

However, even if such a secondary battery is used in which the heat generated by a short-circuit current derived from a lithium dendrite cannot enlarge the short circuit's part, then when a charging voltage beyond the reference voltage is applied, lithium may be deposited partly on the negative electrode. Then, a lithium dendrite can be formed and deteriorate the secondary battery. This would present a disadvantage in that the demand cannot be met that the secondary battery be restrained from being degraded so that its life can be secured.

SUMMARY OF THE INVENTION

It is an object of the present invention to provide a charging system, a charging apparatus and a battery pack which are capable of increasing the battery capacity of a secondary battery and restraining the secondary battery from deteriorating so that its life can be secured in response to the needs of a user.

A charging system according to an aspect of the present invention, comprising: a secondary battery which includes a heat-resistant member having a heat-resistance property between a negative electrode and a positive electrode thereof; a charging-voltage supply section which supplies a charging voltage for charging the secondary battery; a charge control section which controls the operation of the charging-voltage supply section on the basis of a reference voltage corresponding to the voltage between the negative electrode and the positive electrode in a full-charge state where the lithium-reference electric potential of the negative electrode is substantially zero volts; and a mode-setting acceptance section which accepts the setting of either of an ordinary charge mode and a high-voltage charge mode, wherein if the mode-setting acceptance section accepts the setting of the ordinary charge mode, then the charge control section allows the charging-voltage supply section to supply, to the secondary battery, a first set voltage equal to, or below, the reference voltage as the charging voltage, and if the mode-setting acceptance section accepts the setting of the high-voltage charge mode, then the charge control section allows the charging-voltage supply section to supply, to the secondary battery, a second set voltage above the reference voltage as the charging voltage, so that the secondary battery is charged at a constant voltage charge. Herein, the design includes measures against the above described dispersion, and thus, the fact that it is substantially zero volts means including a range until the negative-electrode potential becomes approximately 0.1 volts.

Furthermore, a charging apparatus according to an aspect of the present invention, comprising: a connection terminal which makes a connection for a secondary battery that includes a heat-resistant member having a heat-resistance property between a negative electrode and a positive electrode thereof; a charging-voltage supply section which supplies a charging voltage for charging the secondary battery to the connection terminal; a charge control section which controls the operation of the charging-voltage supply section on the basis of a reference voltage corresponding to the voltage between the negative electrode and the positive electrode in a full-charge state where the lithium-reference electric potential of the negative electrode is substantially zero volts; and a mode-setting acceptance section which accepts the setting of either of an ordinary charge mode and a high-voltage charge mode, wherein if the mode-setting acceptance section accepts the setting of the ordinary charge mode, then the charge control section allows the charging-voltage supply section to supply, to the connection terminal, a first set voltage equal to, or below, the reference voltage as the charging voltage, and if the mode-setting acceptance section accepts the setting of the high-voltage charge mode, then the charge control section allows the charging-voltage supply section to supply, to the connection terminal, a second set voltage above the reference voltage as the charging voltage, so that the secondary battery is charged at a constant voltage charge.

Moreover, a battery pack according to an aspect of the present invention, which is connected to a charging apparatus that supplies a charging voltage for charging a secondary battery in accordance with an instruction from the outside, comprising: a secondary battery which includes a heat-resistant member having a heat-resistance property between a negative electrode and a positive electrode thereof; a charge control section which outputs the instruction to the charging apparatus on the basis of a reference voltage corresponding to the voltage between the negative electrode and the positive electrode in a full-charge state where the lithium-reference electric potential of the negative electrode is substantially zero volts; and a mode-setting acceptance section which accepts the setting of either of an ordinary charge mode and a high-voltage charge mode, wherein if the mode-setting acceptance section accepts the setting of the ordinary charge mode, then the charge control section outputs an instruction to set a first set voltage equal to, or below, the reference voltage as the charging voltage to the charging apparatus, and thereby, allows the charging apparatus to supply the first set voltage to the secondary battery, and if the mode-setting acceptance section accepts the setting of the high-voltage charge mode, then the charge control section outputs an instruction to set a second set voltage above the reference voltage as the charging voltage to the charging apparatus, and thereby, allows the charging apparatus to supply the second set voltage to the secondary battery, so that the secondary battery is charged at a constant voltage charge.

In the charging system, charging apparatus and battery pack including the above described configurations, if a user wants to increase the secondary battery's battery capacity, the user sets the high-voltage charge mode using the mode-setting acceptance section. Thereby, the second set voltage set to a voltage above the reference voltage is supplied as the charging voltage to the secondary battery, so that it is charged. This helps make the battery capacity larger than the case where the secondary battery is charged at a voltage equal to, or below, the reference voltage. In this case, a lithium dendrite may be formed to short-circuit the negative electrode and the positive electrode. However, the heat-resistant member having a heat-resistance property is provided between the negative electrode and the positive electrode, and thereby, even if a lithium dendrite causes a short-circuit current to flow between the negative electrode and the positive electrode, the heat-resistant member helps restrain the short circuit's part from enlarging. As a result, without damaging the secondary battery, the charging voltage can be heightened beyond the reference voltage, thus increasing the battery capacity. On the other hand, if a user wants to restrain the secondary battery from being degraded so that its life can be secured, the user sets the ordinary charge mode using the mode-setting acceptance. Thereby, the first set voltage equal to, or below, the reference voltage is supplied as the charging voltage to the secondary battery, so that it is charged. This lowers the possibility that lithium may be deposited on the negative electrode. Consequently, the secondary battery is restrained from deteriorating so that its life can be secured. In response to the user's demands, this makes it possible to increase the secondary battery's battery capacity, or restrain the secondary battery from deteriorating so that its life can be secured.

These and other objects, features and advantages of the present invention will become more apparent upon reading of the following detailed description along with the accompanied drawings.

BRIEF DESCRIPTION OF THE DRAWINGS

FIG. 9 is a graphical representation, showing fluctuations in a positive-electrode potential and a negative-electrode potential with respect to a lithium reference in the case where a lithium-ion battery is charged.

DESCRIPTION OF THE PREFERRED EMBODIMENTS

Figure 1:
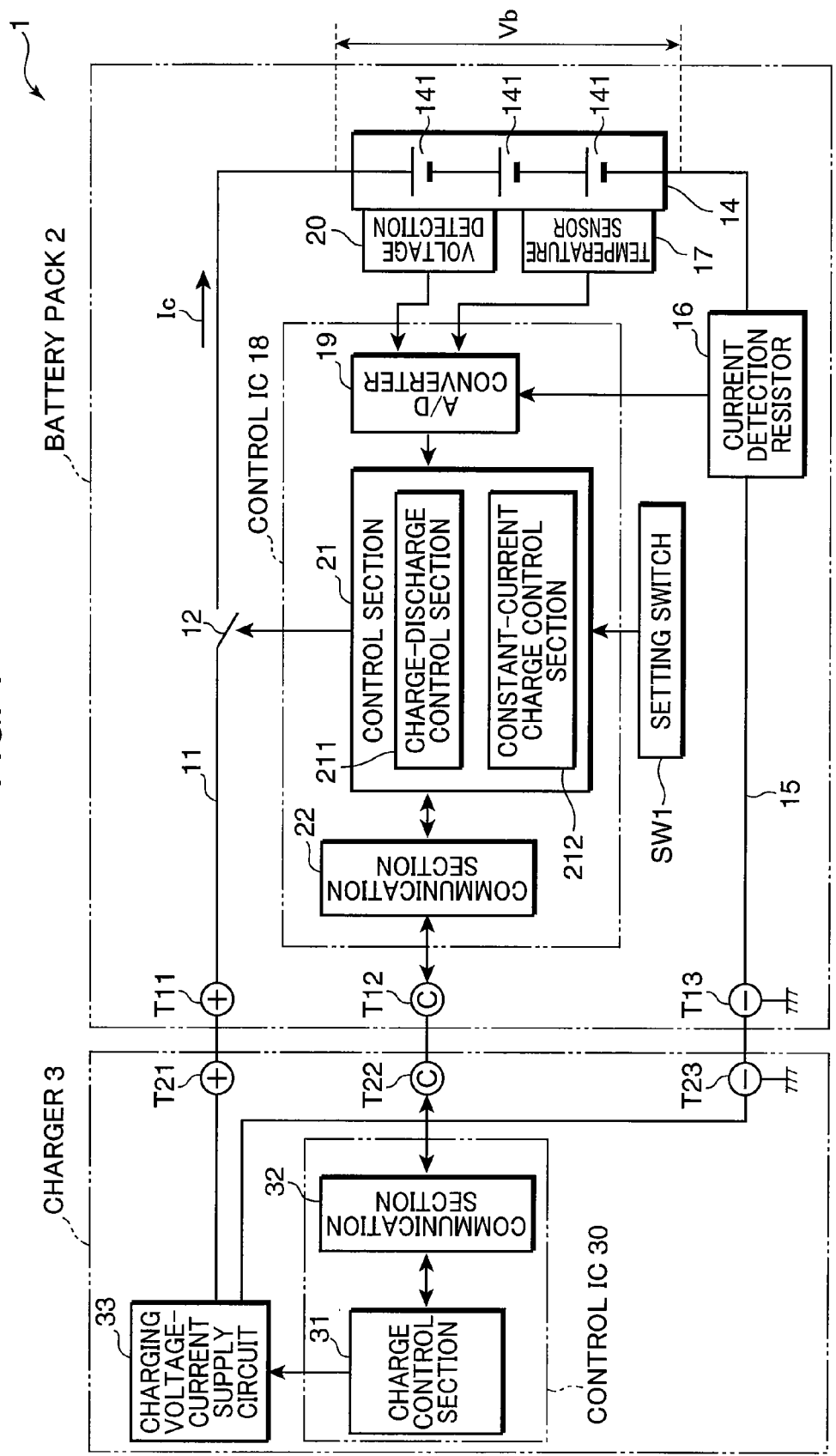
FIG. 1 is a block diagram, showing an example of the configuration of a charging system according to an embodiment of the present invention.

Hereinafter, a charging system according to an embodiment of the present invention will be described with reference to the attached drawings. In each figure, component elements are given the same reference characters and numerals, as long as they are identical to one another. Thus, their description is omitted. FIG. 1 is a block diagram, showing an example of the configuration of the charging system according to an embodiment of the present invention. This charging system 1 is configured by a battery pack 2, and a charger 3 which charges it. Further including load equipment (not shown) supplied with electric power from the battery pack 2, an electronic-equipment system may also be configured. In addition, the charger 3 may also be formed as a part of such load equipment. In that case, the battery pack 2 is charged by the charger 3 in FIG. 1, but the battery pack 2 may also be attached to the load equipment and charged through the load equipment. The battery pack 2 and the charger 3 interconnect through terminals T11, T21 on a DC-high side for a power supply, communication-signal terminals T12, T22, and GND terminals T13, T23 on a power supply and a communication signal. Even if the above described load equipment is used, the same terminals are provided.

Herein, the load equipment is, for example, application equipment which embodies an application by operating based on a power supply from the battery pack 2. As an example of such application equipment, for example, there is electronic equipment such as a notebook personal computer, a digital camera and a cellular phone, a vehicle such as an electric automobile and a hybrid car, or the like.

Herein, inside of the battery pack 2, an FET (or field effect transistor) 12 lies midway on a charge path 11 on the DC-high side extending from the terminal T11. This charge path 11 is connected to the high-side terminal of a battery set 14. The battery set 14's low-side terminal is connected via a charge path 15 on a DC-low side to the GND terminal T13. On this charge path 15, a current detection resistor 16 (i.e., a current detection section) which converts a charging current and a discharging current into voltage values is disposed in its middle.

The battery set 14 includes several secondary batteries (or cells) connected in series-parallel, and it is formed, for example, by connecting three secondary batteries 141 in series. The temperature of the secondary batteries 141 is detected by a temperature sensor 17 and inputted in an analog-digital converter 19 inside of a control IC 18. Further, the voltage between the terminals of each secondary battery 141 is detected by a voltage detection circuit 20 (i.e., the voltage detection section). Then, it is inputted in the analog-digital converter 19 of the control IC 18. Still further, a current value detected by the current detection resistor 16 is also inputted in the analog-digital converter 19 of the control IC 18. The analog-digital converter 19 converts each input value into a digital value and outputs it to a control section 21. Incidentally, the battery set 14 may also be replaced with a single such secondary battery 141.

The control section 21 is formed, for example, by a CPU (or central processing unit) which executes a predetermined arithmetic processing; an ROM (or read only memory) in which a predetermined control program is stored; an RAM (or random access memory) which stores data temporarily; and their peripheral circuits. It functions as a charge-discharge control section 211 (i.e., the charge control section) and a constant-current charge control section 212 by executing the control program stored in the ROM.

To the control section 21, a setting switch SW1 (i.e., the mode-setting acceptance section) is connected which accepts the setting of either of a high-voltage charge mode for increasing the battery set 14's battery capacity an ordinary charge mode for restraining the battery set 14 from being degraded so that its life can be secured, compared with the high-voltage charge mode. The setting switch SW1 is designed, for example, so that if it is turned off, the ordinary charge mode is set while the high-voltage charge mode is set if it is turned on.

As the setting switch SW1, various user-operable setting switches can be used, such as a dipswitch, a rotary switch and a jumper pin. In this case, the setting switch SW1 corresponds to the mode-setting acceptance section in the Claims.

Incidentally, the mode-setting acceptance section is not necessarily limited to an operation switch. It may also be, for example, a communication circuit or the like which receives an instruction for either setting of the high-voltage charge-mode setting and the ordinary-mode setting from external equipment (i.e., the load equipment) such as a personal computer connected to the battery pack 2 or the charger 3. For example, a communication section 22 corresponding to a communication interface circuit which communicates with the charger 3 may also be used as the mode-setting acceptance section.

In this case, for example, in the charger 3, a charge control section 31 (described later) allows a communication section 32 corresponding to a communication interface circuit for the charge control section 31 to transmit the instruction to set either of the high-voltage charge mode and the ordinary charge mode to the communication section 22. Thereby, this instruction is accepted by the communication section 22. Incidentally, the instruction may be transmitted and received by means of an electrical signal (i.e., electronic information). Hence, this is not limited to an example in which it is transmitted and received by means of a communication signal.

Furthermore, no limit is set to such an example where the instruction is transmitted and received by means of an electrical signal. For example, using a mechanical structure, the instruction to set either of the high-voltage charge mode and the ordinary charge mode may also be transferred. For example, in a frame for the charger 3, a protrusion portion may also be provided which juts out from a wall surface thereof which the battery pack 2 is attached to. This protrusion portion is used for indicating which mode of the high-voltage charge mode and the ordinary charge mode should be set. In that case, the battery pack 2 is provided with, for example, as the mode-setting acceptance section, a switch which is pressed and turned on by such a protrusion portion when it is attached to the charger 3. In response to whether such a switch is turned on or off, the setting of either of the ordinary charge mode and the high-voltage charge mode is supposed to be chosen and accepted.

Moreover, the load equipment (i.e., the application equipment) outputs the instruction to set either of the high-voltage charge mode and the ordinary charge mode to the mode-setting acceptance section of the battery pack 2, via the charger 3 (i.e., the communication section 32), or directly by means of an electrical signal, a mechanical structure or the like.

According to such a configuration, apart from a user's utilization purpose, the control of a charge can be selected in accordance with the characteristics of the charger 3 or the load equipment which the battery pack 2 is attached to. Specifically, for example, in the case of load equipment which has a great power consumption and requires a large-capacity battery, it is possible that the high-voltage charge mode can be automatically chosen by attaching the battery pack 2 to such load equipment.

In response to each input value from the analog-digital converter 19, the charge-discharge control section 211 calculates the voltage value and current value of a charging current which the charger 3 is instructed to output. Then, the charge-discharge control section 211 transmits this calculation result from the communication section 22 via the terminals T12, T22; T13, T23 to the charger 3. Besides, based on each input value from the analog-digital converter 19, the charge-discharge control section 211 detects an abnormality in the outside of the battery pack 2, such as a short circuit of the terminals T11, T13 and an abnormal current from the charger 3, an abnormal rise in the temperature of the battery set 14, or the like. Thereby, it conducts a protection operation such as shutting down the FET 12.

The constant-current charge control section 212 turns on the FET 12 and outputs, to the charger 3, an instruction to supply a predetermined constant current Icc. Thereby, it conducts a constant current charge.

Then, if the setting of the ordinary charge mode is accepted by the setting switch SW1 and if a terminal voltage Vb of the battery set 14 obtained in the analog-digital converter 19 becomes a predetermined voltage VF1 or above, the constant-current charge control section 212 stops the constant current charge. At the same time, the charge-discharge control section 211 outputs an instruction to supply the voltage VF1 to the charger 3. Thereby, it conducts a constant-voltage charge.

On the other hand, if the setting of the high-voltage charge mode is accepted by the setting switch SW1 and if the terminal voltage Vb of the battery set 14 obtained in the analog-digital converter 19 becomes a predetermined voltage VF2 or above, the constant-current charge control section 212 stops the constant current charge. At the same time, the charge-discharge control section 211 outputs an instruction to supply the voltage VF2 to the charger 3. Thereby, it conducts a constant-voltage charge.

In a full-charge state where the lithium-reference electric potential of the negative electrode of each secondary battery 141 is substantially zero volts, the voltage between the negative electrode and the positive electrode is set to a reference voltage. In this case, the voltage VF1 is set to a voltage obtained by multiplying a set voltage V1 (i.e., the first set voltage) which is set to a voltage equal to, or below, the reference voltage by a series-cell number SN of the secondary batteries 141 which are included in the battery set 14. In other words, the voltage VF1=the set voltage V1×the series-cell number SN. The voltage VF1 set in this way is applied to the battery set 14, so that the set voltage V1 can be supplied as the charging voltage to each secondary battery 141.

Herein, as described above, the design includes measures against the above described dispersion, and thus, the fact that it is substantially zero volts means including a range until the negative-electrode potential becomes approximately 0.1 volts.

The set voltage V1 is set to a voltage equal to, or below, the reference voltage, for example, to a voltage equivalent to the reference voltage. If lithium cobaltate is used as the positive-electrode active material of the secondary batteries 141, for example, it is set to 4.2 volts equal to the reference voltage. If lithium manganate is used as the positive-electrode active material, for example, it is set to 4.3 volts equal to the reference voltage.

The lithium-ion battery's terminal voltage is affected by the dispersion of the charging-current value, the temperature and the composition of an active material for the positive electrode and negative electrode. However, the end voltage of charge may be set to substantially 4.2 volts if lithium cobaltate or lithium nickelate is mainly used as the positive-electrode active material. If lithium manganate, or a manganese-system positive-electrode active material obtained by substituting manganese for a part of a positive-electrode active material composed of a plurality of metallic elements, is mainly used as the positive-electrode active material, then the end voltage of charge may be set to substantially 4.2 volts or above.

The voltage VF2 is set to a voltage obtained by multiplying a set voltage V2 (i.e., the second set voltage) which is set to a voltage beyond the reference voltage by the series-cell number SN of the secondary batteries 141 which are included in the battery set 14. In other words, the voltage VF2=the set voltage V2×the series-cell number SN. The voltage VF2 set in this way is applied to the battery set 14, so that the set voltage V2 can be supplied as the charging voltage to each secondary battery 141.

The set voltage V2 is set to a voltage above the reference voltage, for example, to a voltage equivalent to the reference voltage. If lithium cobaltate is used as the positive-electrode active material of the secondary batteries 141, for example, it is set to substantially 4.4 volts. If lithium manganate is used as the positive-electrode active material, for example, it is set to substantially 4.5 volts.

Hereinafter, a description will be given about the case where lithium cobaltate is used as the positive-electrode active material of the secondary batteries 141 and the set voltages V1, V2 are set to 4.2 volts, 4.4 volts, respectively.

In the charger 3, the above described instruction is received by the communication section 32 corresponding to a communication means in a control IC 30. For example, the charge control section 31 formed by a microcomputer controls a charging voltage-current supply circuit 33 (i.e., the charging-voltage supply section, the charging-current supply section), so that a charging current is supplied at the above described voltage value, current value and a pulse width. The charging voltage-current supply circuit 33 is made up of an AC-DC converter, a DC-DC converter and the like. It converts an input voltage into the voltage value, current value and pulse width for which an instruction is given by the charge control section 31. Then, it is supplied through the terminals T21, T11; T23, T13 to the charge paths 11, 15.

Incidentally, the present invention is not limited to an example in which the control section 21 and the setting switch SW1 are provided in the battery pack 2. Thus, the control section 21 and the setting switch SW1 may also be provided in the charger 3, or a part of the control section 21 and the setting switch SW1 can be provided in the charger 3. Besides, if the setting switch SW1 is provided in the charger 3, the battery pack 2 may be provided with, as the mode-setting acceptance section, a communication circuit or the like which receives information on a mode set by the setting switch SW1.

Figure 2:
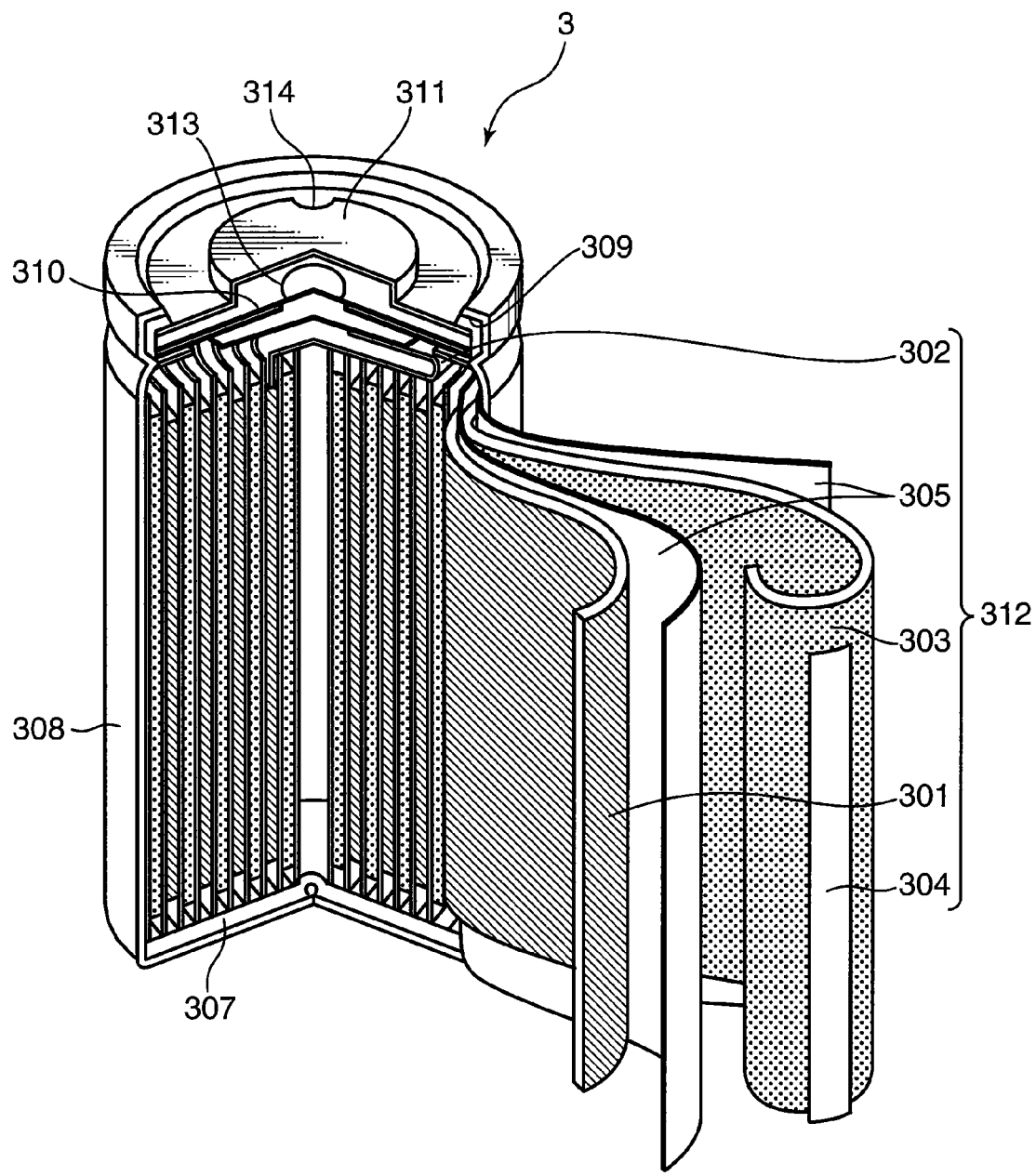
FIG. 2 is a schematic sectional view, showing an example of the configuration of a secondary battery shown in FIG. 1.

FIG. 2 is a schematic sectional view, showing an example of the configuration of each secondary battery 141. The secondary battery 141 shown in FIG. 2 is a non-aqueous electrolyte secondary battery which has a cylindrical shape and includes an electrode-plate group with a roll structure. For example, it is a lithium-ion secondary battery. An electrode-plate group 312 has a spiral structure which is formed by rolling, via separators 305, a positive electrode plate 301 (i.e., the positive electrode) provided with a positive-electrode lead current collector 302 and a negative electrode plate 303 (i.e., the negative electrode) provided with a negative-electrode lead current collector 304. Between the negative electrode plate 303 and each separator 305, a porous protective film (not shown) is formed.

To the top of the electrode-plate group 312, an upper insulating plate (not shown) is attached, and a lower insulating plate 307 is attached to its bottom. The electrode-plate group 312 and a case 308 containing a non-aqueous electrolyte solution (or electrolyte: not shown) are sealed with a gasket 309, a sealing plate 310 and a positive-electrode terminal 311.

In a substantially central part of the sealing plate 310, a groove 313 is formed which has a substantially circular shape or a substantially horseshoe shape. If a gas is generated inside of the case 308 and the internal pressure exceeds a predetermined pressure, the groove 313 is broken so that the gas inside of the case 308 can be emitted. Besides, in a substantially central part of the positive-electrode terminal 311, a convex portion is provided for the connection with the outside. In this convex portion, an electrode opening portion 314 is formed, and through this electrode opening portion 314, the gas emitted when the groove 313 has been broken can be discharged outside of the secondary battery 141.

Figure 3:
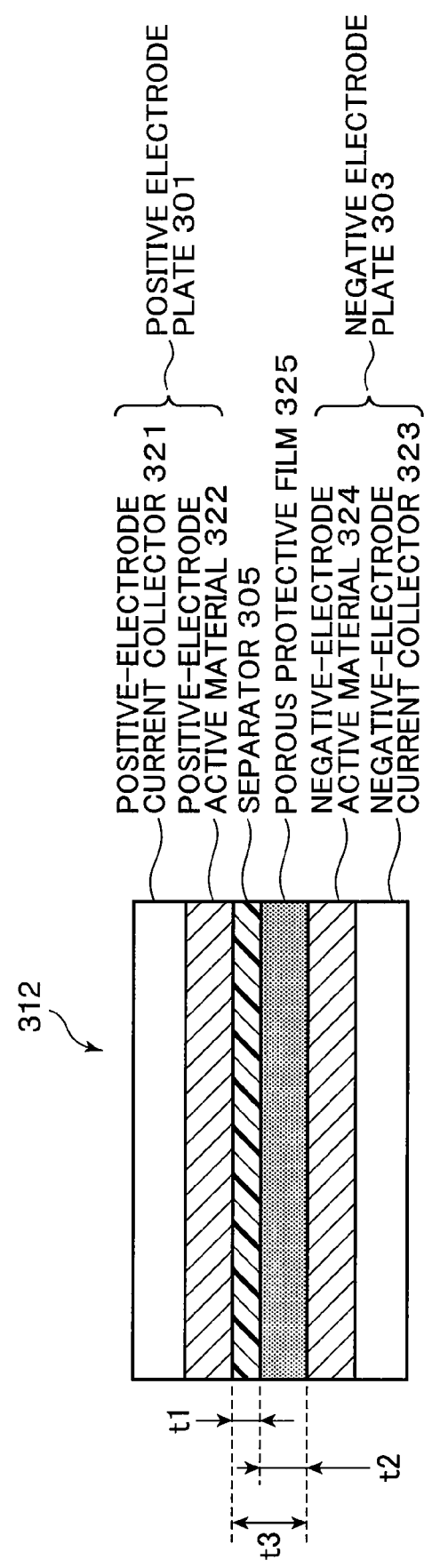
FIG. 3 is a sectional view, showing in detail an example of the configuration of an electrode-plate group shown in FIG. 2.

FIG. 3 is a sectional view, showing in detail the configuration of the electrode-plate group 312. The electrode-plate group 312 shown in FIG. 3 is formed by putting a negative-electrode current collector 323, a negative-electrode active material 324, a porous protective film 325, the separator 305, a positive-electrode active material 322 and a positive-electrode current collector 321, one on top of another in this order.

The positive electrode plate 301 shown in FIG. 3 is formed, for example, by giving the surface of the positive-electrode current collector 321 made of metal foil such as aluminum foil a substantially uniform coat of the positive-electrode active material 322.

The positive-electrode active material 322 contains, as a positive-electrode active material, a transition-metal containing multiple oxide which includes lithium, for example, a transition-metal containing multiple oxide such as $LiCoO_2$ and $LiNiO_2$ which is used in a non-aqueous electrolyte secondary battery. As such a transition-metal containing multiple oxide, it is desirable that a transition-metal containing multiple oxide be used which is formed by replacing a part of Co with another element so that it can be used at a high end voltage of charge and it is capable of forming a good coating by absorbing or decomposing an addition agent on its surface in a high-voltage state.

As this transition-metal containing multiple oxide, specifically, there is, for example, a transition-metal containing multiple oxide which is given by a general formula $Li_aM_bNi_cCo_dO_e$ (M is at least one metal chosen from a group of Al, Mn, Sn, In, Fe, Cu, Mg, Ti, Zn and Mo, $0<a<1.3$, $0.02\leq b\leq 0.5$, $0.02\leq d/c+d\leq 0.9$ and $1.8<e<2.2$, $b+c+d=1$, and $0.34<c$). Especially, in this general formula, preferably, M should be at least one metal chosen from a group of Cu and Fe.

With respect to the positive-electrode active material 322 formed in this way, its volume expansion in a state of charge is reduced. Thereby, for example, even if a charge is given beyond the full-charge state (SOC: 100%) shown in FIG. 9, the positive-electrode active material 322 can be restrained from expanding inside of the case 308. This helps prevent the electrode-plate group 312's central part from buckling.

Hereinafter, a description will be given by taking, as an example, the case where lithium cobaltate is used as the positive-electrode active material 322 (i.e., the case where in a full-charge state where the lithium-reference electric potential of the negative electrode plate 303 of the secondary battery 141 is substantially zero volts, the reference voltage corresponding to the voltage between the negative electrode plate 303 and the positive electrode plate 301 is 4.2 volts) (or in the case where lithium manganate is used as the positive-electrode active material 322, the reference voltage is 4.3 volts).

In addition, the negative electrode plate 303 shown in FIG. 3 is formed, for example, by giving the surface of the negative-electrode current collector 323 made of metal foil such as copper foil a substantially uniform coat of the negative-electrode active material 324.

As the negative-electrode active material 324, there can be used a carbon material, a lithium containing multiple oxide, a material which can be alloyed with lithium or the like, a material which can insert and extract lithium reversibly, and metallic lithium. As the carbon material, for example, there can be mentioned coke, a pyrolytic carbon class, natural graphite, artificial graphite, mesocarbon microbeads, a graphitized-mesophase small sphere, gas-phase growth carbon, a glassy carbon class, carbon fiber (e.g. polyacrylonitrile, a pitch system, a cellulose system and a gas-phase growth carbon system), unshaped carbon, a carbon material having a burnt organic substance, or the like.

Such a material may be used by itself or by mixing two or more. Among those, a carbon material obtained by graphitizing a mesophase small sphere or a graphite material such as natural graphite and artificial graphite is preferable. As a material which can be alloyed with lithium, for example, a simple substance of Si, a compound of Si and O ($SiO_x$) or the like can be enumerated. Such a material may be used by itself or by mixing two or more. If such a silicon-system negative-electrode active material is used, a higher-capacity non-aqueous electrolyte secondary battery can be obtained.

As the separator 305 shown in FIG. 3, an insulating microporous thin film is used which has a great ion-permeability coefficient and a predetermined mechanical strength. It is desirable that the separator 305 be based on a resin material having a melting point of two hundred degrees or below, and particularly, polyolefin should be preferably used. Above all, polyethylene, polypropylene, ethylene-propylene copolymer, a composite of polyethylene and polypropylene or the like is preferable. A polyolefin-made separator having a melting point of two hundred degrees or below melts when an external factor short-circuits the battery. Thereby, the resin material softens and its porous structure is blocked, so that the ion migration can be restrained, or a so-called shot-down effect can be obtained. This makes it possible to enhance the secondary battery 141's safety.

The separator 305 may also be a monolayer film made of a single kind of polyolefin resin, or it can be a multilayer film made of polyolefin resins of two kinds or more. The separator 305's thickness t1 is not especially limited, but preferably, it should be 8 to 30 μm, aiming at maintaining the battery's capacity in its design.

The porous protective film 325 (i.e., the heat-resistant member) shown in FIG. 3 can be obtained, for example, by preparing a coating material (hereinafter, referred to as the porous-film coating material) including an inorganic oxide filler and a resin binder, coating the negative electrode plate 303's surface with this and drying this coating film. The porous-film coating material can be obtained by mixing an inorganic oxide filler and a resin binder with a filler dispersion medium.

As the dispersion medium, preferably, such an organic solvent as N-methyl-2-pyrrolidone (NMP) and cyclohexanone, or water, should be used, but it is not limited to these. The filler, resin binder and dispersion medium can be mixed by using a double-arm agitator such as a planetary mixer, or a wet-type dispersion machine such as a beads mill. As the method for coating the electrode's surface with the porous-film coating material, there can be mentioned a comma-roll method, a gravure-roll method, a dye-coat method or the like.

Incidentally, a coat of the porous protective film 325 is not limited to the negative electrode plate 303's surface, as long as at least either of the surfaces of the negative electrode and the positive electrode is coated with a minute-particle slurry including a resin binder and an inorganic oxide filler. Hence, it may also be formed on the positive electrode plate 301's surface, or it may also be formed opposite each other on both surfaces of the positive electrode plate 301 and the negative electrode plate 303. It is preferable that the porous protective film 325's thickness t2 be within a range of 0.1 to 200 μm.

In order to obtain the heat-resistant porous protective film 325, desirably, the inorganic oxide filler should have a heat-resistance property of 250° C. or above and be electrochemically stable inside of the non-aqueous electrolyte secondary battery's electric-potential window. Many inorganic oxide fillers satisfy these conditions, but among inorganic oxides, preferably, alumina, silica, zirconia, titania or the like should be used. Especially, alumina powder or $SiO_2$ powder (i.e., silica) which has a particle diameter of 0.1 to 50 μm should be preferably chosen. As the inorganic oxide filler, a single kind alone may also be used, or it can be employed by mixing two kinds or more.

In order to obtain such a porous protective film 325 having a good ion conductivity, it is desirable that the inorganic oxide filler's powder density (i.e., tap density) be 0.2 g/cm$^3$ or above and 0.8 g/cm$^3$ or below. If the powder density is below 0.2 g/cm$^3$, then the inorganic oxide filler's bulk becomes too high and the porous protective film 325's structure can be fragile. On the other hand, if the powder density is above 0.8 g/cm$^3$, it would be difficult to form a suitable aperture between the filler particles.

The inorganic oxide filler's particle diameter is not especially limited, but when the particle diameter becomes smaller, the powder density becomes lower easily. The inorganic oxide filler's particle shape is not especially limited, but desirably, it should be an unshaped particle formed by binding together a plurality of (e.g., approximately two to ten, and preferably, three to five) primary particles. The primary particle is usually formed of a single crystal, and thus, the unshaped particle is always a polycrystalline particle.

It is desirable that the quantity of the resin binder included in the porous protective film 325 be 1 weight part or above and 20 weight part or below with respect to the inorganic oxide filler's 100 weight part. More desirably, it should be 1 weight part or above and 5 weight part or below. If the resin binder's quantity exceeds 20 weight part, many pores of the porous protective film 325 is blocked with the resin binder. This can worsen the characteristics of discharge. In contrast, if the resin binder's quantity is below 1 weight part, the contact of the porous protective film 325 with the electrode's surface is loosed. This can separate the porous protective film 325.

In order to maintain the porous protective film 325's thermal stability even if the part where an internal short circuit has been generated becomes a high temperature, it is preferable that the resin binder's melting point or thermal-decomposition temperature be 250° C. or higher. Besides, in the case where the resin binder is made of a crystalline macromolecular, preferably, the crystalline macromolecular's melting point should be 250° C. or higher. However, the porous protective film 325's main ingredient is a heat-resistant inorganic oxide, and thus, the present invention's advantage would not largely depend upon the resin binder's heat-resistance property.

In terms of the range of a porosity P of the porous insulating film, if the ratio of the separator's true volume to its apparent volume is R, then it is determined within a range of $-0.10 \leq R-P \leq 0.30$.

The porous protective film's porosity P can be calculated using the following method. First, preparations are made for a coating material (hereinafter, referred to as the porous-film coating material) which includes the inorganic oxide filler, the resin binder and the dispersion medium for dispersing the filler. This porous-film coating material is applied onto the metal foil and dried. The dried coating film is cut off, together with the metal foil, by an optional area.

Then, the metal foil is removed so that a sample of the porous protective film can be obtained. Using this sample's thickness and area, the porous protective film's apparent volume Va is calculated and the sample's weight is measured. Next, using the sample's weight and the true specific gravities of the inorganic oxide filler and the resin binder, the porous protective film's true volume Vt is calculated. Using the apparent volume Va and the true volume Vt, the porosity P can be calculated in the following expression (1).

$$\text{Porosity } P=(Va-Vt)/Va \quad (1)$$

The porosity P can be set to a desired value by suitably setting the inorganic oxide filler's size, for example, its mean particle diameter, and its shape. It is preferable that it be set, for example, to around 35 to 45%.

The separator 305's ratio R of the true volume to the apparent volume can be calculated using the following method. First, using the separator 305's thickness and area, the separator 305's apparent volume Vas is calculated and the separator 305's weight is measured. Next, using the separator 305's weight and true specific gravity, the separator 305's true volume Vts is calculated. Using the apparent volume Vas and the true volume Vts, the ratio R can be calculated in the following expression (2).

$$\text{Ratio } R=Vts/Vas \quad (2)$$

The inorganic oxide filler can be shaped like a tree, a coral, a cluster or the like because the inorganic oxide filler is a polycrystalline particle. In the polycrystalline particle having such a shape, an excessively-fine filling structure is difficult to form inside of the porous protective film. Therefore, a proper aperture can be suitably formed. The polycrystalline particle includes, for example, a particle formed when around two to ten primary particles melt and join together, a particle formed when about two to ten primary particles contact and unit while growing into a crystal, or the like.

The polycrystalline particle's mean particle diameter (i.e., volume-reference median diameter: D50) can be measured, for example, using a wet-type laser granularity-distribution measuring apparatus by Micro Track Co, or the like. If the polycrystalline particle's mean particle diameter is below twice the mean particle diameter of the primary particles, the porous protective film can take an excessively-fine filling structure. If it exceeds 10 μm, the porous protective film's porosity P becomes too much, and thus, the porous protective film's structure can be fragile.

The method for obtaining such a polycrystalline particle is not especially limited, but for example, it can be obtained by sintering an inorganic oxide to a solid object and pulverizing this solid object moderately. Besides, without any pulverization process, particles are brought into contact with each other while growing into a crystal, so that the polycrystalline particle can be directly obtained.

For example, in the case where α-alumina is sintered to a solid object and the solid object is moderately pulverized so that the polycrystalline particle can be obtained, it is preferable that the sintering temperature be 800 to 1300° C. and the sintering time be 3 to 30 minutes. In addition, such a solid object can be pulverized using wet-type equipment such as a ball mill or dry-type equipment such as a jet-mill jaw crusher. In that case, those skilled in the art could suitably adjust the conditions for pulverization and conduct control so that the polycrystalline particle has an optional mean particle diameter.

Figure 4:
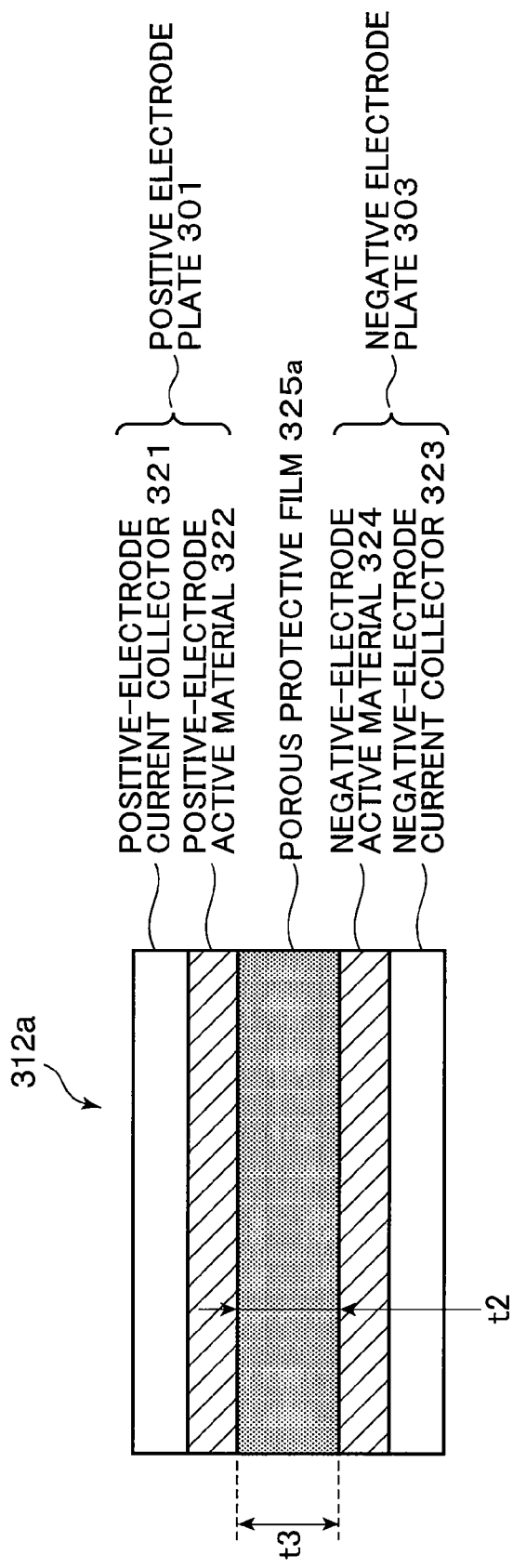
FIG. 4 is a sectional view, showing in detail another example of the configuration of an electrode-plate group shown in FIG. 2.

Incidentally, without using the separator 305, for example, like an electrode-plate group 312a shown in FIG. 4, a porous protective film 325a's porosity P, thickness t2, tortuosity or another characteristic may also be suitably set. Thereby, the separator 305 can be replaced with the porous protective film 325a.

Figure 5:
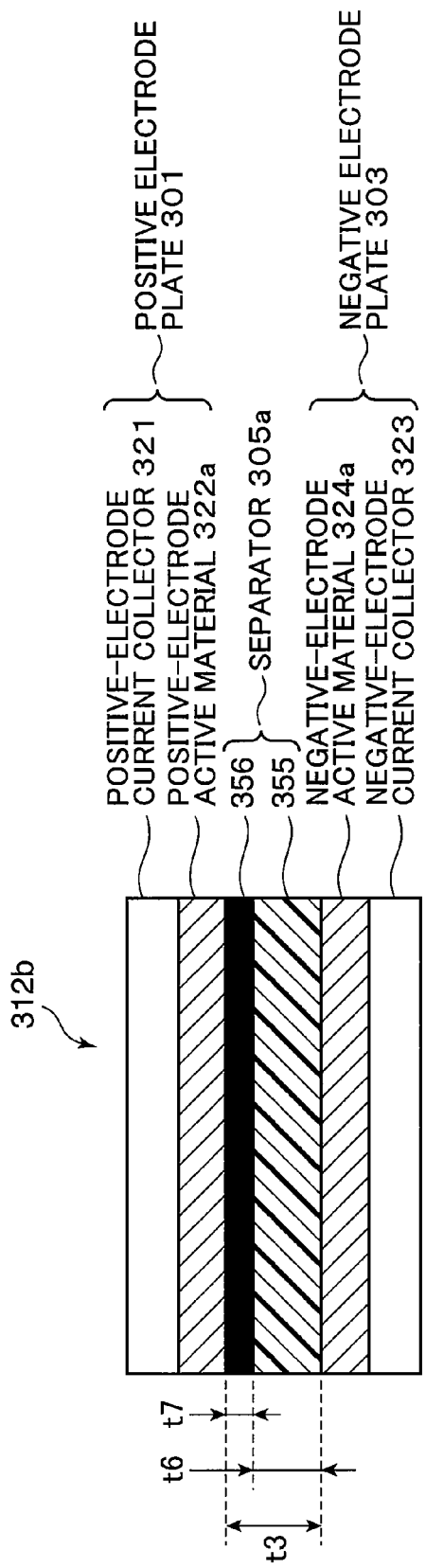
FIG. 5 is a sectional view, showing in detail still another example of the configuration of an electrode-plate group shown in FIG. 2.

Furthermore, instead of the porous protective film 325, for example, like an electrode-plate group 312b shown in FIG. 5, a heat-resistant separator 305a (i.e., the heat-resistant member) may also be used. The heat-resistant separator 305a shown in FIG. 5 is formed, for example, by putting a heat-resistant aramid-resin layer 356 on a surface of a base material 355 made of polyethylene. The polyethylene base material 355's thickness t6 is, for example, approximately 14 μm, and the aramid-resin layer 356's thickness t7 is, for example, approximately 3 to 4 μm.

Figure 6:
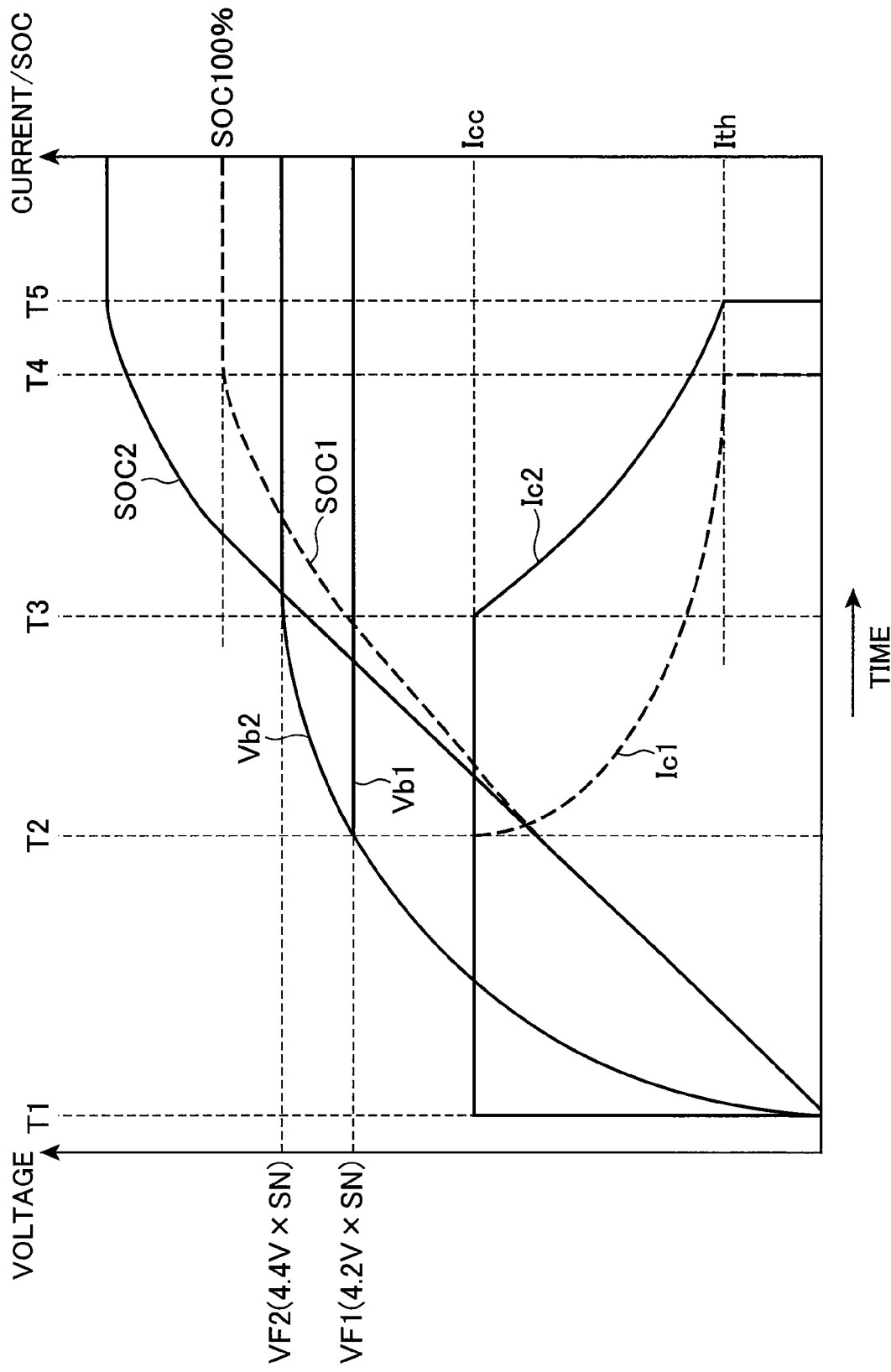
FIG. 6 is a graphical representation, showing an example of the operation of the charging system shown in FIG. 1.
Figure 7:
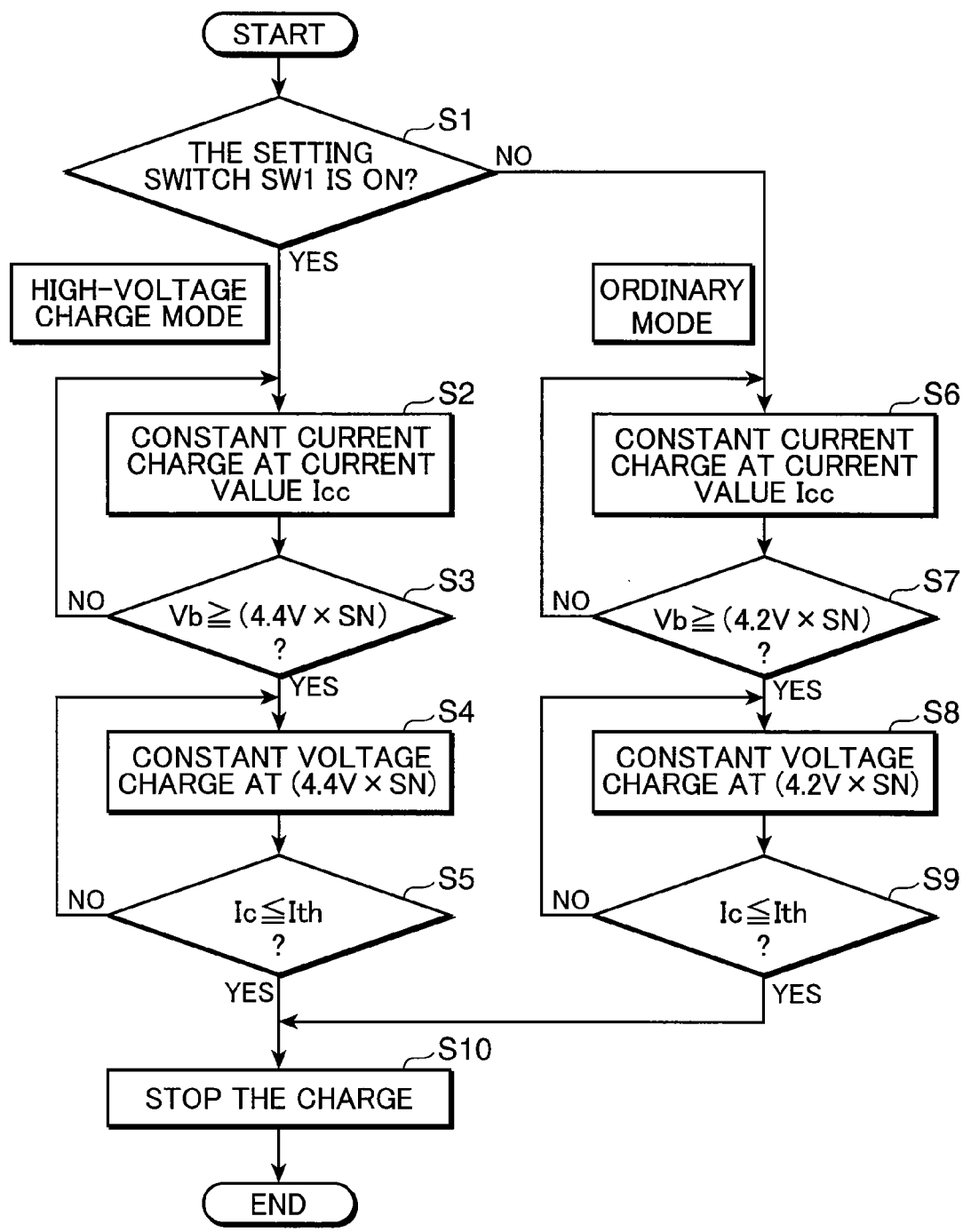
FIG. 7 is a flow chart, showing an example of the operation of the charging system shown in FIG. 1.
Figure 8:
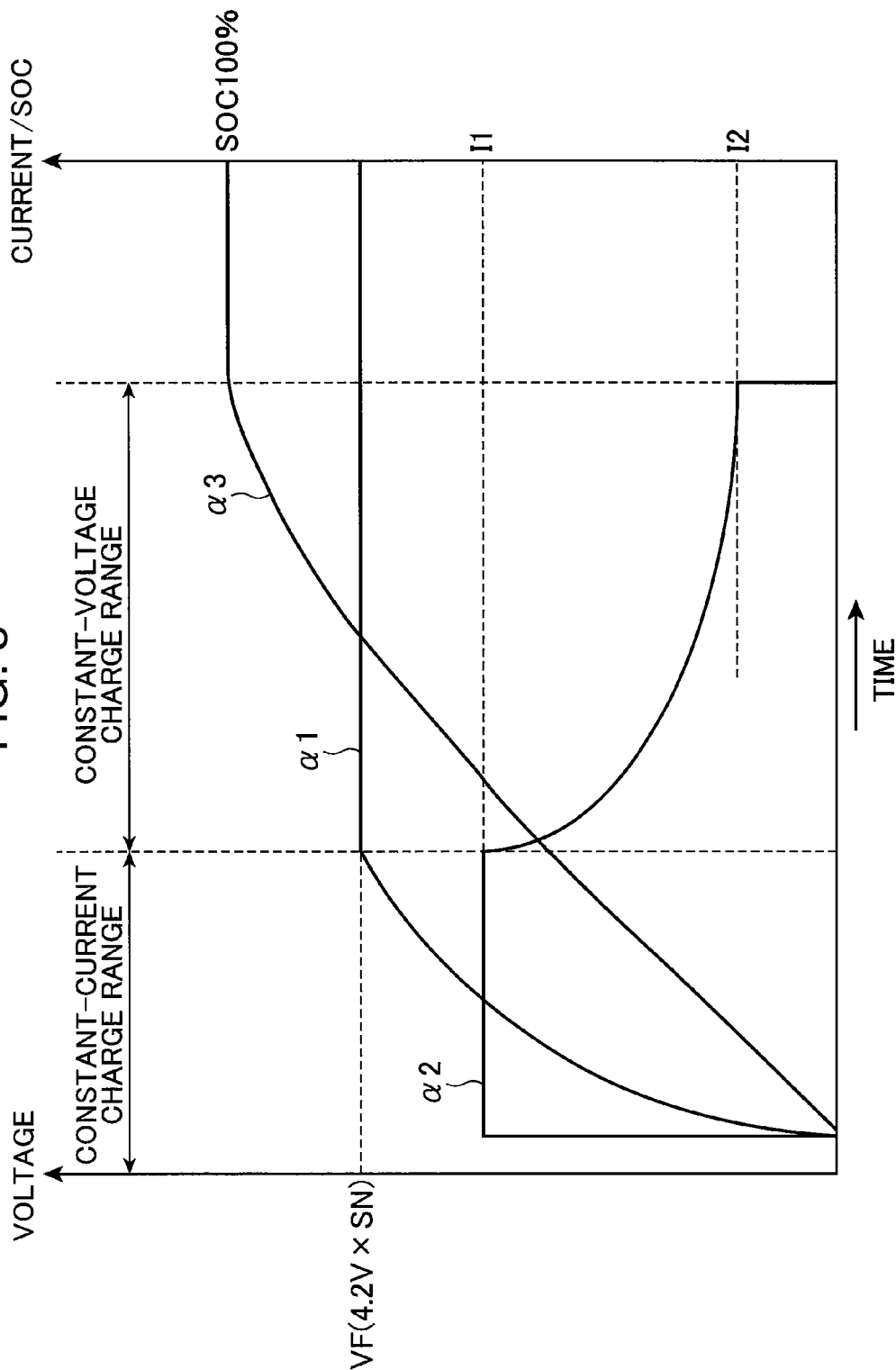
FIG. 8 is a graphical representation, showing a general method of managing a charging voltage and a charging current when a secondary battery is charged according to the background art.

Next, a description will be given about the operation of the charging system 1 configured as described above. FIG. 6 is a graphical representation, showing an example of the operation of the charging system 1 according to the embodiment of the present invention. In FIG. 6, a charging current Ic, a terminal voltage Vb and an SOC in the ordinary charge mode are shown by Ic1, Vb1 and SOC1, and a charging current Ic, a terminal voltage Vb and an SOC in the high-voltage charge mode are shown by Ic2, Vb2 and SOC2. FIG. 7 is a flow chart, showing an example of the operation of the charging system according to the embodiment of the present invention.

First, the constant-current charge control section 212 confirms the setting switch SW1's setting state (in a step S1). If the setting switch SW1 is turned on, the processing shifts to a step S2 for the purpose of conducting a charge in the high-voltage charge mode (YES at the step S1). On the other hand, if the setting switch SW1 is turned off, the processing shifts to a step S6 for the purpose of conducting a charge in the ordinary charge mode (NO at the step S1).

Herein, if a user wants to increase the battery set 14's battery capacity, the user chooses the high-voltage charge mode by turning on the switch SW1. Then, the processing shifts to the step S2. On the other hand, if the user wants to restrain the battery set 14 from being degraded so that the battery life can be secured, the user chooses the ordinary charge mode by turning off the switch SW1. Then, the processing shifts to the step S6.

Moreover, in the same way, by means of the above described electrical signal, mechanical structure or the like, such a charge control mode can also be chosen according to the characteristics of the charger 3 or the load equipment (i.e., the application equipment) to which the battery pack 2 is attached. In this case, a mode for executing the control of a charge is chosen according to the characteristics of the charger 3 or the load equipment to which the battery pack 2 is attached.

First, an operation will be described in the high-voltage charge mode. In the step S2, the constant-current charge control section 212 turns on the FET 12 and outputs an instruction to output the charging current Ic2 for the current value Icc via the communication sections 22, 32 to the charge control section 31. The current value Icc is set, for example, to a current value obtained by multiplying seventy percent of "1C" by a parallel-cell number PN. "1C" is a current level at which a nominal-capacity value NC can be discharged through a one-hour constant-current discharge (e.g., if NC=2000 mAh and two are parallel, then Icc=2800 mA at 70%).

In response to a control signal from the charge control section 31, the charging current Ic2 set to the current value Icc is outputted from the charging voltage-current supply circuit 33. Then, the constant current charge is conducted (at a timing T1).

Next, the constant-current charge control section 212 confirms the terminal voltage Vb2 of the battery set 14 detected by the voltage detection circuit 20 (in a step S3). If the terminal voltage Vb2 becomes the voltage VF2 or above (YES at the step S3), the constant-current charge control section 212 stops the constant current charge. Then, the processing shifts to a step S4 for the purpose of conducting the constant voltage charge. Herein, the voltage VF2 is set to a voltage obtained by multiplying the set voltage V2 which is set to a voltage beyond the reference voltage by the series-cell number SN of the secondary batteries 141 which are included in the battery set 14. In other words, the voltage VF2=the set voltage V2×the series-cell number SN.

The voltage VF2 set in this way is applied to the battery set 14, so that the set voltage V2 can be supplied as the charging voltage to each secondary battery 141. The set voltage V2 is set, for example, to 4.4 volts which is higher than 4.2 volts equivalent to the reference voltage in the case where lithium cobaltate is used as the positive-electrode active material of the secondary batteries 141. Thus, VF2=4.4×SN (if the battery set 14's series-cell number SN is three, then VF2=4.4V× 3=13.2V).

Hence, the fact that the terminal voltage Vb2 becomes equal to, or higher than, the set voltage V2×the series-cell number SN means in principle that the terminal voltage of each secondary battery 141 is the set voltage V2 or above. In this case, the lithium-reference electric potential of the secondary battery 141's negative electrode plate 303 dips substantially below zero volts. Thus, metallic lithium begins to be deposited on the surface of the negative-electrode active material 324.

Herein, as can be seen from the porous protective films 325 and 325a shown in FIG. 3 and FIG. 4 or the separator 305a shown in FIG. 5, in a conventional secondary battery with no heat-resistant member, if metallic lithium is deposited on the negative-electrode surface, the deposited metallic lithium turns to a lithium dendrite and grows toward the positive electrode. Then, it penetrates, for example, a separator made of a resin material such as polyethylene and short-circuits the negative electrode and the positive electrode. As a result, a short-circuit current passing through the lithium dendrite may melt the separator, enlarge the short circuit's part and destroy the battery.

Therefore, in such a conventional secondary battery, in order to prevent lithium from being deposited on the negative electrode, the end voltage Vf is set so that the secondary battery's terminal voltage will not exceed the reference voltage. For example, in a secondary battery in which lithium cobaltate is used as the positive-electrode active material, the set voltage V2 is set to 4.2 volts or below so that it will not exceed 4.2 volts. Consequently, in such a conventional secondary battery, the constant current charge can be conducted only until a timing T2 when the terminal voltage Vb reaches 4.2V×the series-cell number SN.

However, in the secondary battery 141, as can be seen from the porous protective films 325 and 325a shown in FIG. 3 and FIG. 4 or the separator 305a shown in FIG. 5, the heat-resistant member is provided. Thereby, even if a lithium dendrite is formed and short-circuits the positive electrode plate 301 and the negative electrode plate 303, then the separator melts, which prevents the short circuit's part from becoming larger. Thus, the set voltage V2 is set to a voltage above the reference voltage (i.e., 4.2V), for example, 4.4V. This makes it possible to conduct the constant current charge until a timing T3 when the terminal voltage Vb reaches 4.4V×the series-cell number SN.

Next, in the step S4, the charge-discharge control section 211 outputs an instruction to output the voltage VF2 via the communication sections 22, 32 to the charge control section 31. In response to a control signal from the charge control section 31, the voltage VF2 (=the set voltage V2×the series-cell number SN, for example 4.4V×3=13.2V) is outputted from the charging voltage-current supply circuit 33. Thereby, the battery set 14's terminal voltage Vb2 is set to 13.2 volts so that the constant voltage charge is conducted.

Herein, as can be seen from the porous protective films 325 and 325a shown in FIG. 3 and FIG. 4 or the separator 305a shown in FIG. 5, in the case where a conventional secondary battery with no heat-resistant member is charged, in order to avoid a deposit of lithium on the negative electrode, the constant voltage charge needs to be conducted at a voltage of 4.2V×the series-cell number SN or below. However, in the secondary battery 141, as can be seen from the porous protective films 325 and 325a shown in FIG. 3 and FIG. 4 or the separator 305a shown in FIG. 5, the heat-resistant member is provided, as described above, the charge can be conducted at a voltage of 4.4V×the series-cell number SN.

Then, the charge-discharge control section 211 confirms the charging current Ic detected by the current detection resistor 16 (in a step S5). If the charging current Ic becomes a predetermined end current Ith or below (YES at the step S5), the charge-discharge control section 211 allows the processing to shift to a step S10 for the purpose of terminating the charge. The end current Ith is suitably set according to the temperature, for example, a current value of (0.1 A×the parallel-cell number PN) or so.

Next, in the step S10, the charge-discharge control section 211 outputs, to the charge control section 31, an instruction to set the charging voltage to zero. Then, the charge control section 31 sets the charging voltage-current supply circuit 33's output voltage to zero. Thereby, the charge comes to an end (at a timing T5).

As described so far, in the high-voltage charge mode, through the processing of the steps S2 to S5 and S10, the constant voltage charge is given to each secondary battery 141 at the set voltage V2 set to a voltage above the reference voltage, for example, at 4.4 volts. Thereby, as indicated by a reference character A in FIG. 9, the secondary battery 141 is charged until the difference between the secondary battery 141's positive-electrode potential Pp and negative-electrode potential Pm comes to 4.4 volts. Thus, the secondary battery 141 is charged beyond the full-charge state (SOC: 100%). This increases the secondary battery 141's battery capacity, thus raising the battery set 14's battery capacity.

In addition, in the positive-electrode active material 322 configured as described above, its volume expansion due to charge is reduced. Thereby, for example, even if a charge is given to the secondary battery 141 until the SOC exceeds a hundred percent, the positive-electrode active material 322 can be restrained from expanding inside of the case 308. This helps prevent the electrode-plate group 312 from buckling.

Next, an operation will be described in the ordinary charge mode. First, in the step S6, the constant-current charge control section 212 turns on the FET 12 and outputs an instruction to output the charging current Ic1 for the current value Icc via the communication sections 22, 32 to the charge control section 31. In response to a control signal from the charge control section 31, the charging current Ic1 set to the current value Icc is outputted from the charging voltage-current supply circuit 33. Then, the constant current charge is conducted (at the timing T1).

Sequentially, the constant-current charge control section 212 confirms the terminal voltage Vb of the battery set 14 detected by the voltage detection circuit 20 (in a step S7). If the terminal voltage Vb1 becomes the voltage VF1 or above (YES at the step S7, at the timing T2), the constant-current charge control section 212 stops the constant current charge. Then, the processing shifts to a step S8 for the purpose of conducting the constant voltage charge.

Herein, the voltage VF1 is set to a voltage obtained by multiplying the set voltage V1 which is set to a voltage equal to, or below, the reference voltage by the series-cell number SN of the secondary batteries 141 which are included in the battery set 14. In other words, the voltage VF1=the set voltage V1×the series-cell number SN. The voltage VF1 set in this way is applied to the battery set 14, so that the set voltage V1 can be supplied as the charging voltage to each secondary battery 141. The set voltage V1 is set, for example, to 4.2 volts equivalent to the reference voltage in the case where lithium cobaltate is used as the positive-electrode active material of the secondary batteries 141. Thus, VF1=4.2×SN (if the battery set 14's series-cell number SN is three, then VF1=4.2V×3=12.6V).

Hence, the fact that the terminal voltage Vb1 becomes the set voltage V1×the series-cell number SN means in principle that the terminal voltage of each secondary battery 141 is the set voltage V1 or above. In this case, the lithium-reference electric potential of the secondary battery 141's negative electrode plate 303 becomes substantially equal to, or above, zero volts. This lowers the possibility that metallic lithium may be deposited on the surface of the negative-electrode active material 324. Consequently, the secondary battery 141 can be restrained from deteriorating, compared with the high-voltage charge mode.

Next, in the step S8, the charge-discharge control section 211 outputs an instruction to output the voltage VF1 via the communication sections 22, 32 to the charge control section 31. In response to a control signal from the charge control section 31, the voltage VF1 (=the set voltage V1×the series-cell number SN) or 4.2V×3=12.6V is outputted from the charging voltage-current supply circuit 33. Thereby, the battery set 14's terminal voltage Vb1 is set to 12.6 volts so that the constant voltage charge is conducted.

Thereby, the constant voltage charge is conducted within a range where the lithium-reference electric potential of the secondary battery 141's negative electrode plate 303 becomes substantially equal to, or above, zero volts. This lowers the possibility that metallic lithium may be deposited on the surface of the negative-electrode active material 324. Consequently, the secondary battery 141 can be restrained from deteriorating, compared with the high-voltage charge mode.

Then, the charge-discharge control section 211 confirms the charging current Ic detected by the current detection resistor 16 (in a step S9). If the charging current Ic becomes the predetermined end current Ith or below (YES at the step S9), the charge-discharge control section 211 allows the processing to shift to the step S10 for the purpose of terminating the charge. The end current Ith is suitably set according to the temperature, for example, a current value of (0.1 A×the parallel-cell number PN) or so.

Next, in the step S10, the charge-discharge control section 211 outputs, to the charge control section 31, an instruction to set the charging voltage to zero. Then, the charge control section 31 sets the charging voltage-current supply circuit 33's output voltage to zero. Thereby, the charge comes to an end (at a timing T4).

As described so far, in the ordinary charge mode, through the processing of the steps S6 to S10, the constant voltage charge is given to each secondary battery 141 at the set voltage V1 set to a voltage equal to, or below, the reference voltage, for example, at 4.2 volts. Thereby, the secondary battery 141 is not supposed to be charged beyond the full-charge state (SOC: 100%) shown in FIG. 9, thus keeping the negative-electrode potential Pm at zero volts or above. This lowers the possibility that metallic lithium may be deposited on the surface of the negative-electrode active material 324. Consequently, the secondary battery 141 can be restrained from deteriorating, compared with the high-voltage charge mode. This helps secure the secondary battery 141's life.

As described above, through the processing of the steps S1 to S10, if a user wants to increase the battery set 14's battery capacity, the user chooses the high-voltage charge mode by turning on the switch SW1. This makes the battery set 14's battery capacity larger. On the other hand, if the user wants to restrain the battery set 14 from being degraded so that the battery life can be secured, the user chooses the ordinary charge mode by turning off the switch SW1. The ordinary charge mode helps restrain the battery set 14 from being degraded so that the secondary battery 141's life can be secured. Therefore, in response to the needs of a user, the battery capacity of a secondary battery can be increased, or the secondary battery can be restrained from deteriorating so that its life can be secured.

A charging system according to an aspect of the present invention, comprising: a secondary battery which includes a heat-resistant member having a heat-resistance property between a negative electrode and a positive electrode thereof; a charging-voltage supply section which supplies a charging voltage for charging the secondary battery; a charge control section which controls the operation of the charging-voltage supply section on the basis of a reference voltage corresponding to the voltage between the negative electrode and the positive electrode in a full-charge state where the lithium-reference electric potential of the negative electrode is substantially zero volts; and a mode-setting acceptance section which chooses and accepts the setting of either of an ordinary charge mode and a high-voltage charge mode, wherein if the mode-setting acceptance section accepts the setting of the ordinary charge mode, then the charge control section allows the charging-voltage supply section to supply, to the secondary battery, a first set voltage equal to, or below, the reference voltage as the charging voltage, and if the mode-setting acceptance section accepts the setting of the high-voltage charge mode, then the charge control section allows the charging-voltage supply section to supply, to the secondary battery, a second set voltage above the reference voltage as the charging voltage, so that the secondary battery is charged at a constant voltage charge. Herein, the design includes measures against the above described dispersion, and thus, the fact that it is substantially zero volts means including a range until the negative-electrode potential becomes approximately 0.1 volts.

According to this configuration, if a user wants to increase the secondary battery's battery capacity, the user sets the high-voltage charge mode using the mode-setting acceptance section. Thereby, the second set voltage set to a voltage above the reference voltage is supplied as the charging voltage to the secondary battery, so that it is charged. This helps make the battery capacity larger than the case where the secondary battery is charged at a voltage equal to, or below, the reference voltage. In this case, a lithium dendrite may be formed to short-circuit the negative electrode and the positive electrode. However, the heat-resistant member having a heat-resistance property is provided between the negative electrode and the positive electrode, and thereby, even if a lithium dendrite causes a short-circuit current to flow between the negative electrode and the positive electrode, the heat-resistant member helps restrain the short circuit's part from enlarging. As a result, without damaging the secondary battery, the charging voltage can be heightened beyond the reference voltage, thus increasing the battery capacity. On the other hand, if a user wants to restrain the secondary battery from being degraded so that its life can be secured, the user sets the ordinary charge mode using the mode-setting acceptance. Thereby, the first set voltage equal to, or below, the reference voltage is supplied as the charging voltage to the secondary battery, so that it is charged. This lowers the possibility that lithium may be deposited on the negative electrode. Consequently, the secondary battery is restrained from deteriorating so that its life can be secured. In response to the user's demands, this makes it possible to increase the secondary battery's battery capacity, or restrain the secondary battery from deteriorating so that its life can be secured.

Furthermore, it is preferable that the heat-resistant member be a porous protective film including a resin binder and an inorganic oxide filler.

According to this configuration, the porous protective film has a heat-resistance property. Therefore, even if the set voltage is applied between the negative electrode and the positive electrode and a lithium dendrite short-circuits the negative electrode to generate heat, then the porous protective film is prevented from being melted and deformed. This helps restrain the short circuit's part from enlarging and lower the possibility that the secondary battery may be damaged.

Moreover, the heat-resistant member may also be a separator.

According to this configuration, the separator has a heat-resistance property. Therefore, even if the set voltage is applied between the negative electrode and the positive electrode and a lithium dendrite short-circuits the negative electrode to generate heat, then the separator is prevented from being melted and deformed. This helps restrain the short circuit's part from enlarging and lower the possibility that the secondary battery may be damaged.

In addition, it is preferable that $Li_aM_bNi_cCo_dO_e$ (M is at least one metal chosen from a group of Al, Mn, Sn, In, Fe, Cu, Mg, Ti, Zn and Mo, $0<a<1.3$, $0.02 \leq b \leq 0.5$, $0.02 \leq d/c+d \leq 0.9$ and $1.8<e<2.2$, $b+c+d=1$, and $0.34<c$) be used as an active material for the positive electrode.

If $Li_aM_bNi_cCo_dO_e$ (M is at least one metal chosen from a group of Al, Mn, Sn, In, Fe, Cu, Mg, Ti, Zn and Mo, $0<a<1.3$, $0.02 \leq b \leq 0.5$, $0.02 \leq d/c+d \leq 0.9$ and $1.8<e<2.2$, $b+c+d=1$, and $0.34<c$) is used as an active material for the positive electrode, then the active material's volume is restrained from expanding because of the charge. Thereby, even if the charging voltage is increased beyond the reference voltage in the high-voltage charge mode and the charge is further given in the full-charge state, the positive-electrode active material can be restrained from expanding inside of the case housing the electrodes. This helps prevent the electrodes from buckling.

Furthermore, it is preferable that the charging system further comprise: a charging-current supply section which supplies a charging current for charging the secondary battery; a constant-current charge control section which conducts a constant current charge by allowing the charging-current supply section to supply a predetermined constant current to the secondary battery; and a voltage detection section which detects a terminal voltage of the secondary battery, wherein: if the mode-setting acceptance section accepts the setting of the ordinary charge mode and if the terminal voltage detected by the voltage detection section while the constant current charge is being conducted reaches the first set voltage, then the constant-current charge control section stop the constant current charge and the charge control section conduct a constant voltage charge; and if the mode-setting acceptance section accepts the setting of the high-voltage charge mode and if the terminal voltage detected by the voltage detection section while the constant current charge is being conducted reaches the second set voltage, then the constant-current charge control section stop the constant current charge and the charge control section conduct the constant voltage charge.

According to this configuration, in the ordinary charge mode, a constant current charge is given to the secondary battery until the secondary battery's terminal voltage reaches the first set voltage. Thereafter, a constant voltage charge is conducted at the first set voltage. On the other hand, in the high-voltage charge mode, a constant current charge is given to the secondary battery until the secondary battery's terminal voltage reaches the second set voltage. Thereafter, a constant voltage charge is conducted at the second set voltage. In this case, in the high-voltage charge mode, after the constant current charge is given to the secondary battery until the secondary battery's terminal voltage reaches the second set voltage higher than the first set voltage, the constant voltage charge is conducted at this set voltage. Thereby, the period when the constant current charge is conducted becomes longer than the case where the charge is switched from the constant current charge to the constant voltage charge when the secondary battery's terminal voltage reaches the first set voltage. If the charge is switched from the constant current charge to the constant voltage charge, the charging current passing through the secondary battery is gradually reduced. However, as described above, the period for the constant current charge is extended in the high-voltage charge mode, so that the period when the charging current is kept without any decrease becomes longer. As a result, the charging time becomes shorter than the case where the charge is switched to the constant voltage charge when the secondary battery's terminal voltage reaches the first set voltage.

Moreover, it is preferable that the mode-setting acceptance section read mechanical or electronic information given by the charge control section or load equipment receiving a power supply from the secondary battery, and thereby, choose and accept the setting of either of the ordinary charge mode and the high-voltage charge mode.

According to this configuration, apart from a user's utilization purpose, the control of a charge can be executed in accordance with the characteristics of the charging-voltage supply section connected to the secondary battery or the load equipment receiving a power supply from the secondary battery. Specifically, for example, in the case of load equipment which has a great power consumption and requires a large-capacity battery, it is possible that the high-voltage charge mode can be automatically chosen.

Furthermore, a charging apparatus according to an aspect of the present invention, comprising: a connection terminal which makes a connection for a secondary battery that includes a heat-resistant member having a heat-resistance property between a negative electrode and a positive electrode thereof; a charging-voltage supply section which supplies a charging voltage for charging the secondary battery to the connection terminal; a charge control section which controls the operation of the charging-voltage supply section on the basis of a reference voltage corresponding to the voltage between the negative electrode and the positive electrode in a full-charge state where the lithium-reference electric potential of the negative electrode is substantially zero volts; and a mode-setting acceptance section which chooses and accepts the setting of either of an ordinary charge mode and a high-voltage charge mode, wherein if the mode-setting acceptance section accepts the setting of the ordinary charge mode, then the charge control section allows the charging-voltage supply section to supply, to the connection terminal, a first set voltage equal to, or below, the reference voltage as the charging voltage, and if the mode-setting acceptance section accepts the setting of the high-voltage charge mode, then the charge control section allows the charging-voltage supply section to supply, to the connection terminal, a second set voltage above the reference voltage as the charging voltage, so that the secondary battery is charged at a constant voltage charge.

According to this configuration, the secondary battery which includes a heat-resistant member having a heat-resistance property is connected to the connection terminal. Thereby, if a user wants to increase the secondary battery's battery capacity, the user sets the high-voltage charge mode using the mode-setting acceptance section. Thereby, the second set voltage set to a voltage above the reference voltage is supplied as the charging voltage via the connection terminal to the secondary battery, so that it is charged. This helps make the battery capacity larger than the case where the secondary battery is charged at a voltage equal to, or below, the reference voltage. In this case, a lithium dendrite may be formed to short-circuit the negative electrode and the positive electrode. However, the heat-resistant member having a heat-resistance property is provided between the negative electrode and the positive electrode, and thereby, even if a lithium dendrite causes a short-circuit current to flow between the negative electrode and the positive electrode, the heat-resistant member helps restrain the short circuit's part from enlarging. As a result, without damaging the secondary battery, the charging voltage can be heightened beyond the reference voltage, thus increasing the battery capacity. On the other hand, if a user wants to restrain the secondary battery from being degraded so that its life can be secured, the user sets the ordinary charge mode using the mode-setting acceptance. Thereby, the first set voltage equal to, or below, the reference voltage is supplied as the charging voltage via the connection terminal to the secondary battery, so that it is charged. This lowers the possibility that lithium may be deposited on the negative electrode. Consequently, the secondary battery is restrained from deteriorating so that its life can be secured. In response to the user's demands, this makes it possible to increase the secondary battery's battery capacity, or restrain the secondary battery from deteriorating so that its life can be secured.

Moreover, a battery pack according to an aspect of the present invention, which is connected to a charging apparatus that supplies a charging voltage for charging a secondary battery in accordance with an instruction from the outside, comprising: a secondary battery which includes a heat-resistant member having a heat-resistance property between a negative electrode and a positive electrode thereof; a charge control section which outputs the instruction to the charging apparatus on the basis of a reference voltage corresponding to the voltage between the negative electrode and the positive electrode in a full-charge state where the lithium-reference electric potential of the negative electrode is substantially zero volts; and a mode-setting acceptance section which chooses and accepts the setting of either of an ordinary charge mode and a high-voltage charge mode, wherein if the mode-setting acceptance section accepts the setting of the ordinary charge mode, then the charge control section outputs an instruction to set a first set voltage equal to, or below, the reference voltage as the charging voltage to the charging apparatus, and thereby, allows the charging apparatus to supply the first set voltage to the secondary battery, and if the mode-setting acceptance section accepts the setting of the high-voltage charge mode, then the charge control section outputs an instruction to set a second set voltage above the reference voltage as the charging voltage to the charging apparatus, and thereby, allows the charging apparatus to supply the second set voltage to the secondary battery, so that the secondary battery is charged at a constant voltage charge.

According to this configuration, if a user wants to increase the secondary battery's battery capacity, the user sets the high-voltage charge mode using the mode-setting acceptance section. Thereby, the second set voltage set to a voltage above the reference voltage is supplied as the charging voltage from the charging apparatus to the secondary battery, so that it is charged. This helps make the battery capacity larger than the case where the secondary battery is charged at a voltage equal to, or below, the reference voltage. In this case, a lithium dendrite may be formed to short-circuit the negative electrode and the positive electrode. However, the heat-resistant member having a heat-resistance property is provided between the negative electrode and the positive electrode, and thereby, even if a lithium dendrite causes a short-circuit current to flow between the negative electrode and the positive electrode, the heat-resistant member helps restrain the short circuit's part from enlarging. As a result, without damaging the secondary battery, the charging voltage can be heightened beyond the reference voltage, thus increasing the battery capacity. On the other hand, if a user wants to restrain the secondary battery from being degraded so that its life can be secured, the user sets the ordinary charge mode using the mode-setting acceptance. Thereby, the first set voltage equal to, or below, the reference voltage is supplied as the charging voltage from the charging apparatus to the secondary battery, so that it is charged. This lowers the possibility that lithium may be deposited on the negative electrode. Consequently, the secondary battery is restrained from deteriorating so that its life can be secured. In response to the user's demands, this makes it possible to increase the secondary battery's battery capacity, or restrain the secondary battery from deteriorating so that its life can be secured.

The present invention can be suitably applied to: a charging system which is used as a battery mounting apparatus for electronic equipment such as a notebook personal computer and a digital camera, a vehicle such as an electric automobile and a hybrid car, or the like; a battery pack which is used as a power source for such a battery mounting apparatus; and a charging apparatus that charges such a battery pack.

This application is based on Japanese patent application serial No. 2006-326721 filed on Dec. 4, 2006, and 2007-292285 filed on Nov. 9, 2007, in Japan Patent Office, the contents of which are hereby incorporated by reference.

Although the present invention has been fully described by way of example with reference to the accompanied drawings, it is to be understood that various changes and modifications will be apparent to those skilled in the art. Therefore, unless otherwise such changes and modifications depart from the scope of the present invention hereinafter defined, they should be construed as being included therein.

What is claimed is:

1. A charging system, comprising:
a secondary battery which includes a heat-resistant member having a heat-resistance property between a negative electrode and a positive electrode thereof;
a charging-voltage supply section which supplies a charging voltage for charging the secondary battery;
a charge control section which controls the operation of the charging-voltage supply section on the basis of a reference voltage corresponding to the voltage between the negative electrode and the positive electrode in a full-charge state where the lithium-reference electric potential of the negative electrode is substantially zero volts;
a mode-setting acceptance section which accepts the setting of either of an ordinary charge mode and a high-voltage charge mode;
a charging-current supply section which supplies a charging current for charging the secondary battery;
a constant-current charge control section which conducts a constant current charge by allowing the charging-current supply section to supply a predetermined constant current to the secondary battery; and
a voltage detection section which detects a terminal voltage of the secondary battery, wherein:
if the mode-setting acceptance section accepts the setting of the ordinary charge mode, then the charge control section allows the charging-voltage supply section to supply, to the secondary battery, a first set voltage equal to, or below, the reference voltage as the charging voltage, and if the mode-setting acceptance section accepts the setting of the high-voltage charge mode, then the charge control section allows the charging-voltage supply section to supply, to the secondary battery, a second set voltage above the reference voltage as the charging voltage, so that the secondary battery is charged at a constant voltage charge,
if the mode-setting acceptance section accepts the setting of the ordinary charge mode and if the terminal voltage detected by the voltage detection section while the constant current charge is being conducted reaches the first set voltage, then the constant-current charge control section stops the constant current charge and the charge control section conducts the constant voltage charge, and
if the mode-setting acceptance section accepts the setting of the high-voltage charge mode and if the terminal voltage detected by the voltage detection section while the constant current charge is being conducted reaches the second set voltage, then the constant-current charge control section stops the constant current charge and the charge control section conducts the constant voltage charge.

2. The charging system according to claim 1, wherein the heat-resistant member is a porous protective film including a resin binder and an inorganic oxide filler.

3. The charging system according to claim 1, wherein the heat-resistant member is a separator.

4. The charging system according to claim 1, wherein $Li_aM_bNi_cCo_dO_e$ (M is at least one metal chosen from a group of Al, Mn, Sn, In, Fe, Cu, Mg, Ti, Zn and Mo, $0<a<1.3$, $0.02 \leq b \leq 0.5$, $0.02 \leq d/c+d \leq 0.9$ and $1.8<e<2.2$, $b+c+d=1$, and $0.34<c$) is used as an active material for the positive electrode.

5. The charging system according to claim 1, wherein the mode-setting acceptance section obtains mechanical or electronic information given by the charge control section or load equipment receiving a power supply from the secondary battery, and thereby, and accepts the setting of either of the ordinary charge mode and the high-voltage charge mode.

6. The charging system according to claim 2, wherein $Li_aM_bNi_cCo_dO_e$ (M is at least one metal chosen from a group of Al, Mn, Sn, In, Fe, Cu, Mg, Ti, Zn and Mo, $0<a<1.3$, $0.02 \leq b \leq 0.5$, $0.02 \leq d/c+d \leq 0.9$ and $1.8<e<2.2$, $b+c+d=1$, and $0.34<c$) is used as an active material for the positive electrode.

7. A charging system, comprising:
a secondary battery which includes a heat-resistant member having a heat-resistance property between a negative electrode and a positive electrode thereof;
a charging-voltage supply section which supplies a charging voltage for charging the secondary battery;
a charge control section which controls the operation of the charging-voltage supply section on the basis of a reference voltage corresponding to the voltage between the negative electrode and the positive electrode in a full-charge state where the lithium-reference electric potential of the negative electrode is substantially zero volts; and
a mode-setting acceptance section which accepts the setting of either of an ordinary charge mode and a high-voltage charge mode, wherein:
if the mode-setting acceptance section accepts the setting of the ordinary charge mode, then the charge control section allows the charging-voltage supply section to supply, to the secondary battery, a first set voltage equal to, or below, the reference voltage as the charging voltage, and if the mode-setting acceptance section accepts the setting of the high-voltage charge mode, then the charge control section allows the charging-voltage supply section to supply, to the secondary battery, a second set voltage above the reference voltage as the charging voltage, so that the secondary battery is charged at a constant voltage charge,
the heat-resistant member is a porous protective film including a resin binder and an inorganic oxide filler,
$Li_aM_bNi_cCo_dO_e$ (M is at least one metal chosen from a group of Al, Mn, Sn, In, Fe, Cu, Mg, Ti, Zn and Mo, $0<a<1.3$, $0.02 \leq b \leq 0.5$, $0.02 \leq d/c+d \leq 0.9$ and $1.8<e<2.2$, $b+c+d=1$, and $0.34<c$) is used as an active material for the positive electrode,
the charging system further comprises:
a charging-current supply section which supplies a charging current for charging the secondary battery;
a constant-current charge control section which conducts a constant current charge by allowing the charging-current supply section to supply a predetermined constant current to the secondary battery; and
a voltage detection section which detects a terminal voltage of the secondary battery,
if the mode-setting acceptance section accepts the setting of the ordinary charge mode and if the terminal voltage detected by the voltage detection section while the constant current charge is being conducted reaches the first set voltage, then the constant-current charge control section stops the constant current charge and the charge control section conducts a constant voltage charge, and if the mode-setting acceptance section accepts the setting of the high-voltage charge mode and if the terminal voltage detected by the voltage detection section while the constant current charge is being conducted reaches the second set voltage, then the constant-current charge control section stops the constant current charge and the charge control section conducts the constant voltage charge.

8. The charging system according to claim 7, wherein the mode-setting acceptance section obtains mechanical or electronic information given by the charge control section or load equipment receiving a power supply from the secondary battery, and thereby, chooses and accepts the setting of either of the ordinary charge mode and the high-voltage charge mode.

* * * * *